Nov. 12, 1940.  W. A. SMITH, JR  2,221,117
ROTATION MECHANISM FOR ROCK DRILLS
Filed June 30, 1938
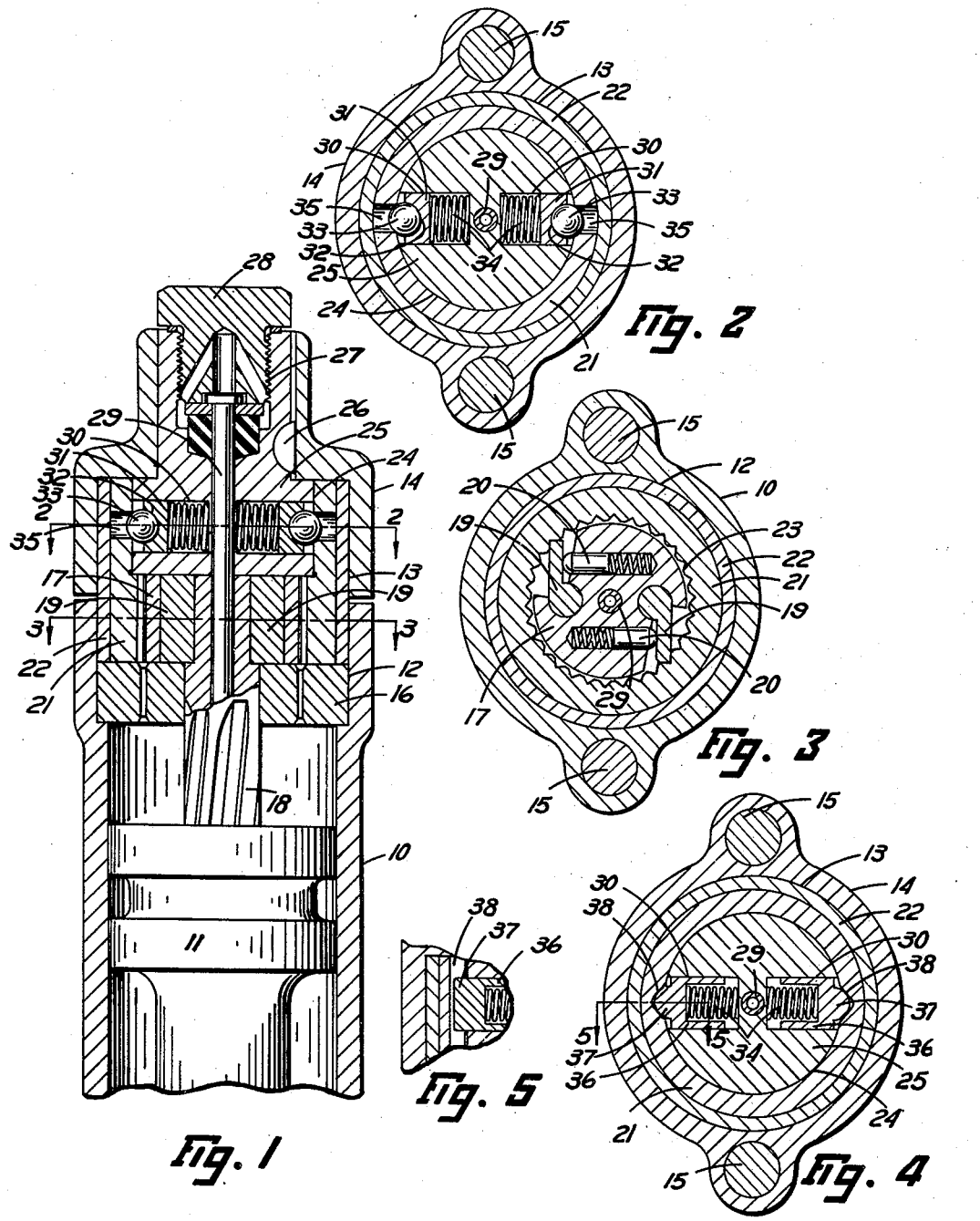
INVENTOR
WILLIAM A. SMITH, JR.
BY
ATTORNEY Patented Nov. 12, 1940

2,221,117

UNITED STATES PATENT OFFICE 2,221,117

ROTATION MECHANISM FOR ROCK DRILLS

William A. Smith, Jr., Cleveland, Ohio, assignor to The Cleveland Rock Drill Company, Cleveland, Ohio, a corporation of Ohio Application June 30, 1938, Serial No. 216,659

4 Claims. (Cl. 121—7)

This invention relates broadly to rock drills, but more particularly to a mechanism for rotating the drill steel.

One object of this invention is to provide a rotation mechanism for rock drills with a clutch automatically releasable for rendering said mechanism inoperative when the drill steel normally rotated thereby is subjected to an abnormal resistance, the clutch being automatically reengageable after release.

Other objects of this invention will be apparent from the following detailed description wherein similar characters of reference designate corresponding parts and wherein:

Fig. 1 is a longitudinal sectional view of the upper end of a rock drill embodying the invention.

Fig. 2 is a cross sectional view taken in a plane indicated by line 2—2 in Fig. 1.

Fig. 3 is a cross sectional view taken in a plane indicated by line 3—3 in Fig. 1.

Fig. 4 is a view similar to Fig. 1 showing a modification of the invention, and

Fig. 5 is a longitudinal sectional view taken in a plane indicated by line 5—5 in Fig. 4.

Referring to the drawing, 10 represents the cylinder of the rock drill having a piston 11 reciprocable therein by motive fluid alternatively admitted into both ends of the cylinder. The upper end of the cylinder 10 is enlarged to form a counterbore 12 of a diameter equal to that of another counterbore 13 formed within a back head 14 which is coaxially secured above the cylinder by side bolts 15. Resting on the bottom of the counterbore 12, there is a bearing plate 16 supporting the head 17 of a rifle bar 18, which bar extends through the plate 16 into the piston 11 where it is operatively associated with a rifle nut (not shown). The head 17 is adequately machined to pivotally receive two or more pawls 19 constantly urged outwardly by spring pressed plungers 20. Also supported by the bearing plate 16, and extending therefrom to the bottom of the counterbore 13, there is a sleeve or ratchet ring 21 capable of rotation within a hardened bushing 22 clamped between the bottom of the counterbore 13 and the bearing plate 16. For a portion of its length equal to the length of the head 17 of the rifle bar 16, the ring 21 is formed with internal teeth 23 surrounding the head 17 and engageable by the pawls 19.

Above the teeth 23, the ring 21 is enlarged to form a smooth counterbore 24 having mounted therein the lower end portion of a stationary cap or locking member 25 held against rotation relative to the back head 14 by any suitable means such as a key 26. The cap 25 is internally threaded as at 27 to receive a removable plug 28 by which a tube 29 is held in position, which tube extends through the cap 25 and the rifle bar 18 for conveying cleansing fluid such as compressed air or water to the drill steel.

Within the lower end portion of the cap 25, there are two diametrically disposed radially extending bores 30, each having slidable therein a seat or washer 31 formed with a socket 32 accommodating a ball 33, which ball is urged outwardly by a spring 34 acting on the washer 32. Adjacent the balls 33, the ring 21 is provided with two diametrically disposed radial holes 35 of a diameter somewhat smaller than that of the balls and forming within the counterbore 24 notches adapted to receive the balls for releasably locking the ring 21 to the stationary cap 25.

In the modification shown in Fig. 4, the balls are replaced by plungers 36 slidable within the bores 30, each having its outer end wall shaped with a cross rib 37 of semi-circular cross section, which rib is engageable with the side walls of one or the other of two V-shaped grooves 38 cut in the inner wall of the counterbore 24 and extending longitudinally thereof.

The operation of the mechanism is as follows: During the forward or working strokes of the piston 11 within the cylinder 10, the rifle bar 18, due to its operative association with the piston, will rotate in a counterclockwise direction in Fig. 3, which rotation is not prevented by the engagement of the pawls 19 with the teeth 23. After the piston has delivered its blow to the drill steel, it will start in its return stroke, that is toward the bearing plate 16. During this return stroke, the piston 11, due to its operative engagement with the rifle bar 18, will impart a torque to the bar 18 in a clockwise direction in Fig. 3. In this instance, the pawls 19 engaging the teeth 23 will prevent rotation of the bar in a clockwise direction, consequently causing the piston 11 to rotate in a counterclockwise direction, which rotation is transmitted to the drill steel by any suitable chuck well known in this art.

To enable this rotation of the piston and the consequential rotation of the drill steel in one direction, it will be understood that the rifle bar 18 must be locked against rotation in one direction. This lock is accomplished by the pawls 19 engaging the teeth 23 of the ratchet ring 21, which ring is normally held against rotation by the clutch including the spring loaded balls 33 held under pressure in the notches formed in the ring by the holes 35. When the piston 11 is subjected to a predetermined or abnormal resistance to rotation such as resulting from the binding of the drill steel in the ground, it will transmit to the rifle bar 18 an additional torque which will in turn be transmitted to the ring 21 by the pawls 19. In this instance, the notches 35 engaged by the balls 33 will exert sufficient pressure on the balls for driving them into the bores 30 against the effort of the springs 34, thereby enabling a momentary rotation of the ring 21 and a return stroke of the piston 11 without rotation. This rotation of the ring will continue during each return stroke of the piston until the drill steel, vibrated by the impacts of the piston thereon, is released from its binding condition. Thereafter, the balls 33 dropping into the notches 35 will create sufficient friction between the ring 21 and the cap 25 to overcome the torque to which the ring is subjected, and will lock the ring against further rotation for enabling the piston to resume its rotation during its return strokes, which rotation is again transmitted to the drill steel.

In the modification shown in Figs. 4 and 5, the rib 37 of each plunger 36 engaging the side walls of the corresponding V-shaped groove 38, will normally hold the ring against rotation. However, when the ring is subjected to an abnormal torque, the side walls of the grooves 38 will exert sufficient pressure on the plunger 36 to release the ring, and thereafter be reengaged by the plungers 36 to again lock the ring against rotation in the manner above described.

In practice, the springs 34 are made in a manner calculated to enable release of the clutch between the ring 21 and the cap 25 prior to the stalling of the piston 11 within the cylinder 10, which stalling would otherwise take place when the action of the motive fluid on the piston is not sufficient to overcome the torque resistance to which the drill steel may be subjected. In the case of a hand held rock drill, the springs 34 are made to cause release of the clutch at a time when the torque transmitted to back head 14 may still be comfortably resisted by the operator holding the rock drill, thereby overcoming the possibility of subjecting the operator to an excessive fatigue and facilitating operation of the drill.

I claim:

1. In a rock drill, the combination with a cylinder and a reciprocatory piston in the cylinder, of a ratchet mechanism operatively associated with the piston responsive to its reciprocation for normally effecting its rotation, said mechanism including a rotatable ratchet ring, a stationary locking member internally of said ratchet ring, notches on said ring, and spring loaded detents carried by said member normally engaging said notches for preventing rotation of said ring, the interengaging surfaces of said notches and detents being shaped and disposed in a manner effecting inward movement of said detents out of said notches upon a predetermined resistance to rotation of said piston to enable rotation of said ring.

2. In a rock drill, the combination with a cylinder and a reciprocatory piston in the cylinder, of a ratchet mechanism operatively associated with the piston responsive to its reciprocation for normally effecting its rotation, said mechanism including a rotatable ratchet ring formed with a sleevelike extension, a stationary member within the extension of said ring, notches on the inner surface of said extension, spring loaded detents carried by said stationary member normally engaging said notches for preventing rotation of said ring, and means responsive to a predetermined resistance to rotation of said piston for effecting inward release movement of said detents to enable rotation of said ring.

3. In a rock drill, the combination with a cylinder and a reciprocatory piston in the cylinder, of a ratchet mechanism operatively associated with the piston responsive to its reciprocation for normally effecting its rotation, said mechanism including a rotatable ratchet ring, notches on the inner surface of said ring, and spring loaded detents within said ring held against rotation with the ring, said detents normally engaging said notches for preventing rotation of said ring and being capable of inward release movement relative to the ring to enable said rotation.

4. In a rock drill, the combination with a cylinder and a reciprocatory piston in the cylinder, of a ratchet mechanism operatively associated with the piston responsive to its reciprocation for normally effecting its rotation, said mechanism including a rotatable ratchet ring, notches on the inner surface of said ring, detents within said ring held against rotation therewith, and means active on said detents for effecting their operative engagement with said notches to prevent rotation of said ring during certain conditions of operation and enabling inward release movement of the detents to enable said rotation during other conditions of operation.

WILLIAM A. SMITH, Jr.